United States Patent
Lai et al.

(10) Patent No.: US 10,061,940 B2
(45) Date of Patent: Aug. 28, 2018

(54) SECURE PROTECTION PROCESSOR AND METHOD INCLUDING COMPARING AN INSTRUCTION SECURITY ATTRIBUTE OF AN INSTRUCTION AND A SECURITY ATTRIBUTE OF AN OPERATIONAL EVENT

(71) Applicant: ANDES TECHNOLOGY CORPORATION, Hsin-Chu (TW)

(72) Inventors: Chi-Chang Lai, Hsinchu County (TW); Chuan-Hua Chang, Taipei (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 684 days.

(21) Appl. No.: 13/938,218

(22) Filed: Jul. 9, 2013

(65) Prior Publication Data

US 2015/0020211 A1    Jan. 15, 2015

(51) Int. Cl.
*G06F 21/71*  (2013.01)
*G06F 12/14*  (2006.01)
*G06F 9/38*  (2018.01)
*G06F 21/60*  (2013.01)
*G06F 21/52*  (2013.01)

(52) U.S. Cl.
CPC .......... *G06F 21/71* (2013.01); *G06F 9/3861* (2013.01); *G06F 12/1491* (2013.01); *G06F 21/52* (2013.01); *G06F 21/60* (2013.01); *G06F 12/1441* (2013.01)

(58) Field of Classification Search
CPC ........ G06F 9/3861; G06F 12/14; G06F 21/00; G06F 21/50; G06F 21/52; G06F 21/60; G06F 12/1491; G06F 21/71
See application file for complete search history.

(56) References Cited

U.S. PATENT DOCUMENTS

| | | | |
|---|---|---|---|
| 4,787,031 A | * | 11/1988 | Karger ................ G06F 12/1491 711/E12.097 |
| 4,962,533 A | * | 10/1990 | Krueger ................. G06F 21/79 711/163 |
| 5,845,129 A | | 12/1998 | Wendorf et al. |
| 7,068,545 B1 | | 6/2006 | Kimelman et al. |
| 7,171,539 B2 | | 1/2007 | Mansell et al. |
| 7,305,534 B2 | | 12/2007 | Watt et al. |

(Continued)

FOREIGN PATENT DOCUMENTS

| CN | 101065737 | 10/2007 |
|---|---|---|
| CN | 101095122 | 12/2007 |

OTHER PUBLICATIONS

Duarte, "CPU Rings, Privilege, and Protection", Aug. 20, 2008, pp. 1-8.*

*Primary Examiner* — David J. Huisman
(74) *Attorney, Agent, or Firm* — JCIPRNET (57) ABSTRACT

A secure protection method executed by a processor is provided. The secure protection method includes the following steps: Perform a security checking before or after executing an instruction according to an instruction security attribute (ISA) of the instruction and a security attribute (SA) of an operational event (OE); and ignore the OE, defer the OE, or raise a security exception when the security checking fails. The OE is generated as a side effect when the processor fetches or executes the instruction, or generated as a monitoring result on the instruction, or generated in response to an external input of the processor.

14 Claims, 6 Drawing Sheets

(56) References Cited

U.S. PATENT DOCUMENTS

| | | |
|---|---|---|
| 7,673,345 B2 | 3/2010 | Cheng et al. |
| 7,793,083 B2 | 9/2010 | Harada et al. |
| 7,822,979 B2 | 10/2010 | Mittal |
| 2003/0093686 A1* | 5/2003 | Barnes .................. G06F 12/109 713/190 |
| 2006/0149911 A1 | 7/2006 | Kimelman et al. |
| 2007/0079093 A1 | 4/2007 | Axford et al. |
| 2008/0052534 A1* | 2/2008 | Harada ............... G06F 12/0891 713/190 |
| 2009/0150645 A1 | 6/2009 | Ono et al. |
| 2009/0222816 A1 | 9/2009 | Mansell et al. |
| 2009/0259846 A1 | 10/2009 | Watt et al. |
| 2012/0079458 A1* | 3/2012 | Williams ............ G06F 9/30189 717/124 |

* cited by examiner

FIG. 9

SECURE PROTECTION PROCESSOR AND METHOD INCLUDING COMPARING AN INSTRUCTION SECURITY ATTRIBUTE OF AN INSTRUCTION AND A SECURITY ATTRIBUTE OF AN OPERATIONAL EVENT

BACKGROUND OF THE INVENTION

Field of the Invention

The present invention relates to a secure protection method and a processor. More particularly, the present invention relates to a secure protection method and a processor enforcing computing security.

Description of the Related Art

In the field of computing security, the execution and access of a program is usually confined to an individual execution environment by a set of rigid rules. Those rules ensure that every instruction of every program executed by the processor is valid and secure in order to protect the execution environment from unintended or unauthorized access.

SUMMARY OF THE INVENTION

Accordingly, the present invention is directed to a secure protection method and a processor enforcing computing security at program view address spaces to provide solid security boundary for software execution.

According to an embodiment of the present invention, a secure protection method executed by a processor is provided. The secure protection method includes the following steps: Perform a security checking before or after executing an instruction according to an instruction security attribute (ISA) of the instruction and a security attribute (SA) of an operational event (OE); and ignore the OE, defer the OE, or raise a security exception when the security checking fails. The OE is generated as a side effect when the processor fetches or executes the instruction, or generated as a monitoring result on the instruction, or generated in response to an external input of the processor.

According to another embodiment of the present invention, a processor is provided. The processor includes an instruction fetch unit, an instruction operation unit, an OE generator, and a security checking unit. The instruction operation unit is coupled to the instruction fetch unit. The OE generator is coupled to the instruction fetch unit and the instruction operation unit. The security checking unit is coupled to the instruction fetch unit, the instruction operation unit, and the operational event generator. The instruction fetch unit fetches an instruction from an instruction fetch address space. The instruction operation unit executes the instruction. The OE generator generates an OE as a side effect when the instruction fetch unit fetches the instruction or when the instruction operation unit executes the instruction, or as a monitoring result on the instruction, or in response to an external input of the processor. The security checking unit performs a security checking before or after the instruction operation unit executes the instruction according to an ISA of the instruction and an SA of the OE. The OE generator ignores the OE, defers the OE, or raises a security exception when the security checking fails.

According to another embodiment of the present invention, another secure protection method is provided. The secure protection method is executed by a processor and includes the following steps: Perform a first security checking based on an SA and a code SA of a first instruction when the first instruction is a security service instruction; and raise a security exception when the first security checking fails.

According to another embodiment of the present invention, another processor is provided. The processor includes an instruction fetch unit, an instruction operation unit, and a security checking unit. The instruction fetch unit fetches a first instruction from an instruction fetch address space (IFAS). The instruction operation unit is coupled to the instruction fetch unit to execute the first instruction. The security checking unit is coupled to the instruction fetch unit and the instruction operation unit. The security checking unit performs a first security checking based on an ISA and a code SA of the first instruction when the first instruction is a security service instruction. The security checking unit raises a security exception when the first security checking fails.

According to another embodiment of the present invention, another secure protection method is provided. This secure protection method is a combination of the two aforementioned secure protection methods provided by the present invention.

According to another embodiment of the present invention, another processor is provided. This processor is a combination of the two aforementioned processors provided by the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
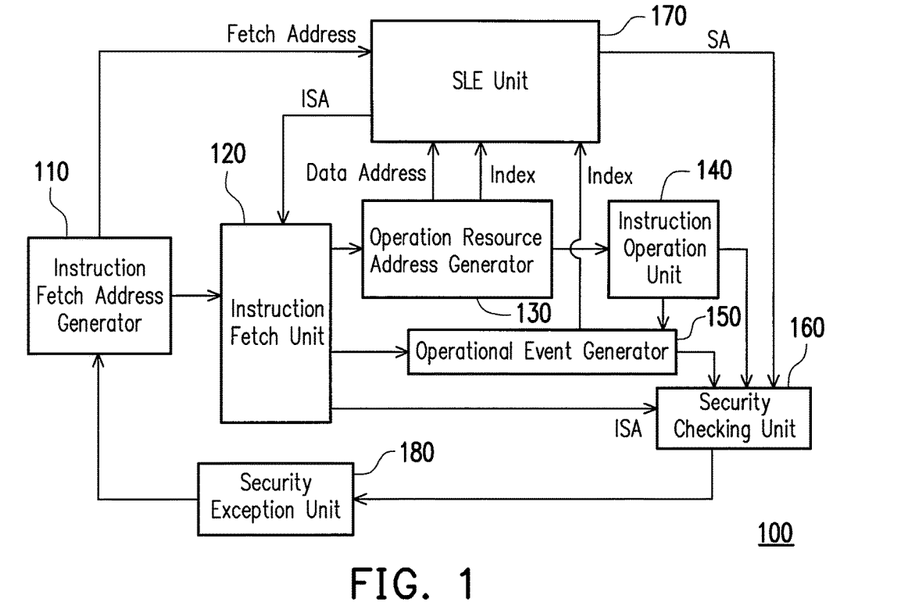
FIG. 1 is a schematic diagram showing a part of a processor according to an embodiment of the present invention.

FIG. 1 is a schematic diagram showing a part of a processor 100 according to an embodiment of the present invention. The processor 100 includes an instruction fetch address generator 110, an instruction fetch unit 120, an operation resource address generator 130, an instruction operation unit 140, an operational event (OE) generator 150, a security checking unit 160, a security lookup entry (SLE) unit 170, and a security exception unit 180. The instruction fetch unit 120 is coupled to the instruction fetch address generator 110. The operation resource address generator 130 is coupled to the instruction fetch unit 120. The instruction operation unit 140 is coupled to the operation resource address generator 130. The OE generator 150 is coupled to the instruction fetch unit 120 and the instruction operation unit 140. The security checking unit 160 is coupled to the instruction fetch unit 120, the instruction operation unit 140, and the OE generator 150. The SLE unit 170 is coupled to the instruction fetch address generator 110, the instruction fetch unit 120, the operation resource address generator 130, the OE generator 150, and the security checking unit 160. The security exception unit 180 is coupled to the instruction fetch address generator 110 and the security checking unit 160. In some other embodiments of the present invention, the security exception unit 180 may be further coupled to some other components of the processor 100, such as the instruction fetch unit 120, the operation resource address generator 130, the instruction operation unit 140, or the OE generator 150, to control their operations during exception handling.

The processor 100 enforces computing security by performing security checking and the core of security checking is comparing security attributes (SAs) of instructions, operation resources accessed by instructions, and OEs. An OE may be generated by the OE generator 150 as side effect when the instruction fetch unit 120 fetches an instruction or when the instruction operation unit 140 executes an instruction (such as exception), or as a monitoring result on an instruction (such as hardware debugging events, namely, instruction breakpoint, data watchpoint, single-stepping, or instruction trace), or in response to external input of the processor (such as interrupt). The SAs may be obtained from a plurality of SLEs provided by the SLE unit 170.

The SLEs are entries stored in a lookup table in the SLE unit 170 for determining SAs for instructions, operation resources, and OEs. The SLE unit 170 may acquire some or all of the SLEs from an external input to the processor 100. An SLE may include one or more security factors. The security factors may be called SAs when they are a part of an SLE or when they have been tagged to instructions, operation resources, or OEs. When all or a portion of security factors of an SLE are used to form an SA for tagging to an instruction, an operation resource, or an OE, the SA is called instruction SA (ISA) or data SA (DSA) respectively.

Additionally, an SLE that is looked up by instruction from instruction fetch address space (IFAS) or data from load/store address space (LSAS) may include a tag specifying a region of address space in either the IFAS or the LSAS or both. Some SLEs might not have a tag. Instead, such an SLE is associated with an index. Practically these are the SLEs to be looked up for getting SAs for registers, SLEs or OEs, wherein these registers and SLEs are operation resources of some special instructions.

As stated above, an SLE may record a tag specifying a region of an address space and an SA associated with the region. The region may be a part of an IFAS from which the processor 100 fetches instructions or a part of an LSAS mapped to an external interface of the processor 100 that a LOAD instruction reads data from and/or a STORE instruction writes data to. There may be one or more IFASs and one or more LSASs accessed by the processor 100. Each IFAS and LSAS may include one or more regions. The regions may be associated with the same SA or different SAs. An aforementioned tag may specify its region by recording the base address and the size of the region or recording the first address and the last address of the region.

An SA may include one or more security factors that can be used to control security. For example, one of the security factors may be security privilege level (SPL). The SPL defines level of privilege in numbers for security checking. A security checking compares two SAs to determine which SA is more secure. The comparison is based on the security factors of the two SAs. For example, when each SA includes the SPL security factor, the two SPLs may be compared. The SA whose SPL has the smaller number is more secure. In some other embodiments of the present invention, the SA whose SPL has the larger number is more secure.

Figure 2:
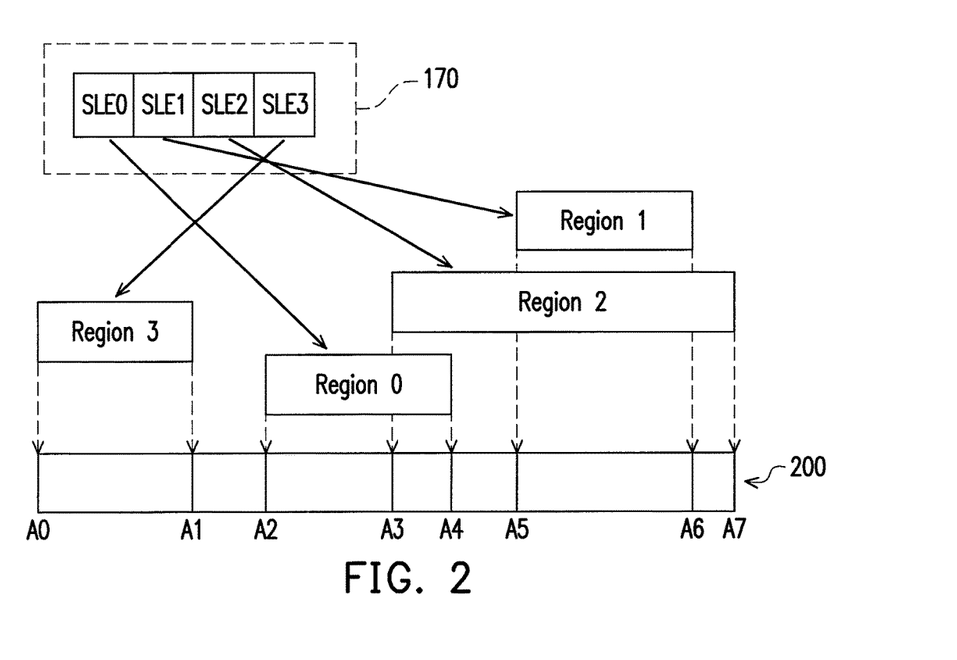
FIG. 2 is a schematic diagram showing some SLEs and their associated regions in an address space according to an embodiment of the present invention.

FIG. 2 is a schematic diagram showing four SLEs and their associated regions in an address space 200 according to an embodiment of the present invention. The four SLEs provided by the SLE unit 170 are marked as SLE0-SLE3, which are associated with the regions 0-3 respectively. The address space 200 may be an IFAS or an LSAS. The region 0 begins at the address A2 and ends at the address A4. The region 1 begins at the address A5 and ends at the address A6. The region 2 begins at the address A3 and ends at the address A7. The region 3 begins at the address A0 and ends at the address A1. The region 2 overlaps with the regions 0 and 1.

Every instruction is fetched from its fetch address. An instruction may access an operation resource for its execution. The operation resource accessed by an instruction may be a data addressed in an LSAS, a register of the processor 100, or an SLE provided by the SLE unit 170. The address of the data is an address in an LSAS mapped to an internal storage or an external interface of the processor 100 that the instruction reads data from or writes data to.

When the SLE unit 170 receives a fetch address of an instruction or a data address of an operation resource accessed by an instruction, the SLE unit 170 may look up a region in the SLEs according to the received address. When there is only one SLE whose region covers the received address and the received address is the fetch address of an instruction, the SLE unit 170 may tag all or portion of the security factors of the SA of that SLE to that instruction. The tagged security factors become the SA of that instruction. The SA of an instruction is also known as instruction SA (ISA).

When there is only one SLE whose region covers the received address and the received address is the data address of an operation resource accessed by an instruction, the SLE unit 170 may tag all or portion of the security factors of the SA of that SLE to that operation resource. The tagged security factors become the SA of that operation resource. The SA of an operation resource is also known as data SA (DSA).

When there is more than one SLE whose region covers the received address, the SLE unit 170 may select one of those SLEs according to any priority scheme and tags all or portion of the security factors of the SA of the selected SLE to that instruction or operation resource. For example, the SLE unit 170 may select the SLE with the most secure SA.

Take the regions shown in FIG. 2 for example. When the SLE unit 170 receives a fetch address of an instruction that falls in the region 3, the SLE unit 170 may tag the instruction with the SA of SLE3. Similarly, when the SLE unit 170 receives a data address of an operation resource accessed by of an instruction that falls in the region 3, the SLE unit 170 may tag the operation resource with the SA of SLE3. When the SLE unit 170 receives a fetch address of an instruction that falls in the region 1, the SLE unit 170 may select SLE1 or SLE2 and tag the instruction with the SA of the selected SLE because the region 1 overlaps with the region 2 such that both SLE 1 and SLE2 match the fetch address. Similarly, when the SLE unit 170 receives a data address of an operation resource accessed by an instruction that falls in the region 1, the SLE unit 170 may select SLE1 or SLE2 and tag the operation resource with the SA of the selected SLE.

As mentioned above, an SLE may be associated with an index. Some instructions can access registers directly and some instructions can access SLEs directly. When the operation resource accessed by an instruction is a register of the processor 100 or an SLE, the register or the SLE has a corresponding index. Some OEs also have corresponding internal indices. When the SLE unit 170 receives such an index, the SLE unit 170 may tag all or portion of the security factors of the SA of an SLE whose index matches the received index to the register, the SLE, or the OE. The tagged security factors become the SA of the register, the SLE, or the OE. Alternatively, in some other embodiments of the present invention, part or all of the registers, the SLEs, and the OEs may be associated with hard-coded SAs instead of the SAs recorded in the SLE unit 170.

There is a special kind of instruction known as security service instruction (SSI). An SSI may be used to call for service provided by instructions located in a more secure region, or by instructions located in a region that cannot be called to provide service through regular instructions. For example, assume that a smaller SPL number is more secure than a larger SPL number. Normally a function-call instruction with an SPL 3 calling for service provided by a subroutine with an SPL 2 triggers a security checking violation. However, by using an SSI defined for the SPL 3, an instruction flow with an SPL 3 can call for service provided by another instruction flow with an SPL 2 without triggering a security checking violation. Different SSIs may be defined for different ISAs to call for service from each ISA. For example, there may be an SSI defined for the SPL 3 to call service from the SPL 2, an SSI defined for the SPL 3 to call service from the SPL 1, and another SSI defined for the SPL 2 to call service from SPL 1, and so on. Illegal use of SSI is a security checking violation. For example, an instruction flow with an SPL 3 executing an SSI defined for the SPL 2 is illegal.

An SSI is associated with two SAs. One of the two SAs is the ISA associated with the fetch address of the SSI. The other one of the two SAs is a code SA associated with the instruction code and/or operands of the SSI. The code SA of an SSI may be obtained according to the index of the SSI and the index may be derived from the instruction code and/or operands of the SSI. In some embodiments of the present invention, the group identification (group ID, details below) associated with the ISA of the SSI may be used for generation of the index of the SSI, too. When the SLE unit 170 receives an index of an SSI, the SLE unit 170 may tag all or portion of the security factors of the SA of an SLE whose index matches the received index to the SSI. The tagged security factors become the code SA of the SSI.

In some embodiments of the present invention, each SA recorded in the SLEs may be associated with a group ID. The group ID may be stored in the SLEs or stored elsewhere. In some embodiments of the present invention, group ID checking may be included in a security checking with the current instruction vs. the next instruction or in a security checking with the current instruction vs. an operation resource accessed by the current instruction.

For a security checking with the current instruction vs. the next instruction, there is a security violation when the ISA of the next instruction is more secure than the ISA of the current instruction. For a security checking with the current instruction vs. its operation resource, there is a security violation when the DSA of the operation resource is more secure than the ISA of the current instruction. However, some embodiments of the present invention may optionally require further checking with group IDs when the aforementioned security checking with SAs has no security violation.

Figure 4:
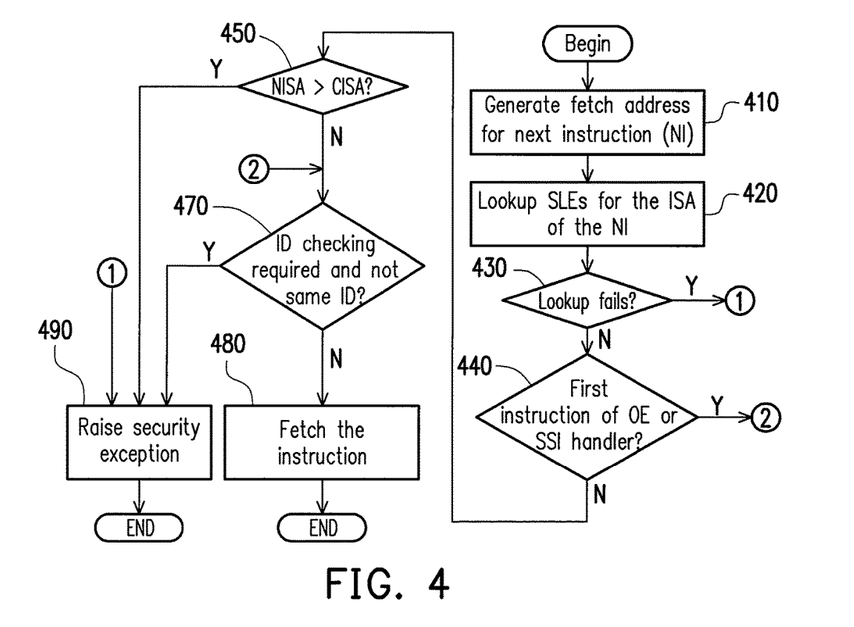
Figure 6:
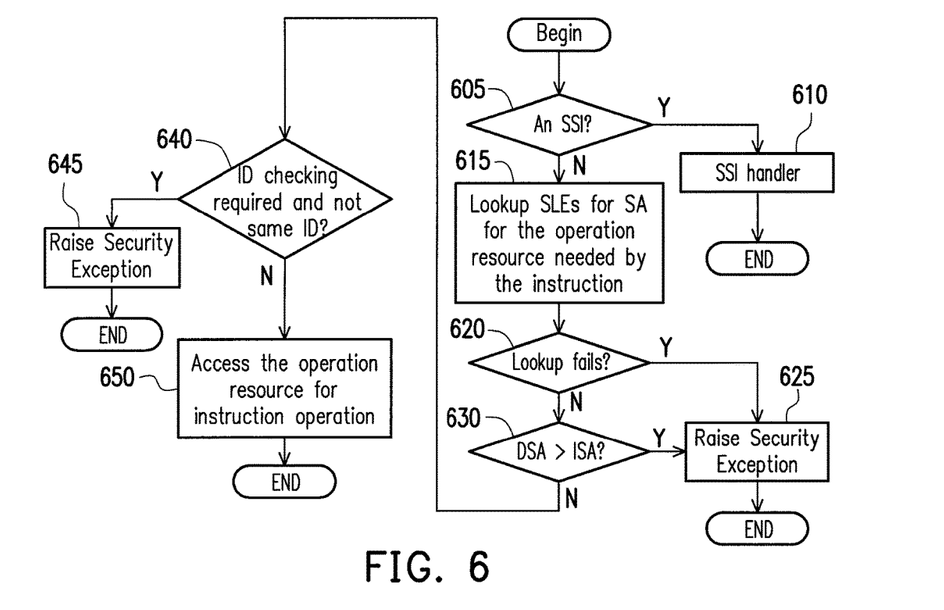

When group ID checking is required in case of no security violation in the aforementioned SA checking, the security checking passes if the group ID associated to the ISA of the current instruction is the same as the group ID associated to the DSA of the operation resource (or the ISA of the next instruction), while the security checking fails if the two group IDs are different. Two examples of such group ID checking are shown in FIG. 4 and FIG. 6. When group ID checking is not required, the security checking is regarded as passed when the two SAs are equally secure.

In addition, each SLE may further be associated with one or more ID checking attribute bit(s) to decide whether the group ID checking is performed when the two SAs checked are the same or when the two SAs are different (when there is no security violation in SA security checking). The ID checking attribute bit(s) may be stored in their associated SLE or stored elsewhere.

In some embodiments of the present invention, a host debugging mode is implemented. When a debugging event (an OE) is raised in the host debugging mode, the processor 100 may redirect its instruction flow to a special port or special address space, where further instructions for debugging handling are fed to the port or the address space from an external host through a physical debugging interface (commonly called in-circuit debugging port) of the processor 100. Since external instructions may raise security concern, such instructions may be treated as a separate region virtually. In other words, the SLE unit 170 may provide a special SLE solely dedicated to the host debugging mode. Whenever the instruction fetch address generator 110 looks up for the ISA of an external instruction in the host debugging mode, the SLE unit 170 always tag the SA and the group ID obtained from this special SLE to the external instruction regardless of the fetch address of the external instruction. The special SLE is not used for any other purpose.

Figure 3:
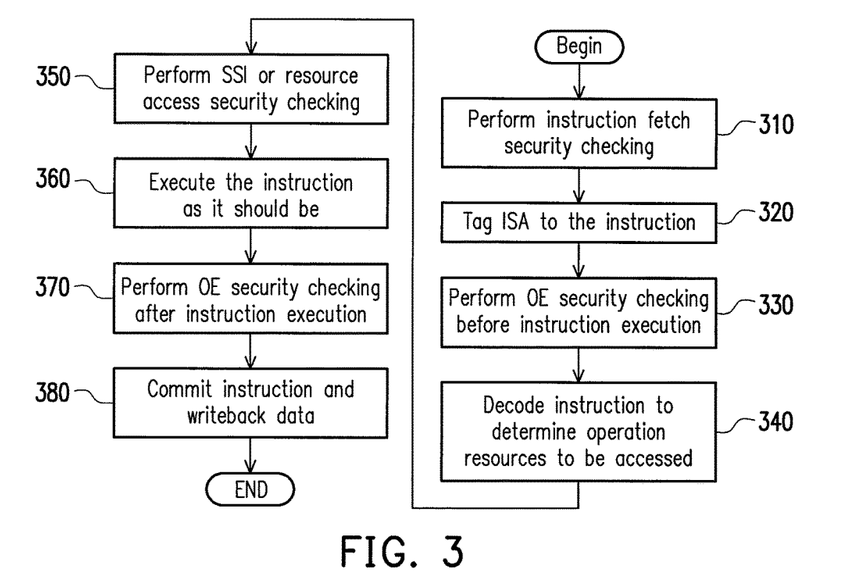
FIG. 3 to FIG. 9 are flow charts showing a secure protection method according to an embodiment of the present invention.

FIG. 3 is a flow chart showing a secure protection method executed by the processor 100 according to an embodiment of the present invention. In step 310, the instruction fetch address generator 110 generates a fetch address of an instruction, the instruction fetch unit 120 fetches the instruction according to the fetch address from an IFAS, and the security checking unit 160 performs an instruction fetch security checking, whose details are shown in FIG. 4. For this security checking, the instruction fetch address generator 110 provides the fetch address to the SLE unit 170. The SLE unit 170 looks up an SA in the SLEs according to the fetch address and provides the SA to the instruction fetch unit 120 for tagging to the new instruction to be fetched from the fetch address in step 320. As a result, the instruction fetch unit 120 obtains the ISA of the instruction from one of the SLEs whose region covers the fetch address of the instruction. The ISA of the instruction is used in the instruction fetch security checking.

Figure 5:
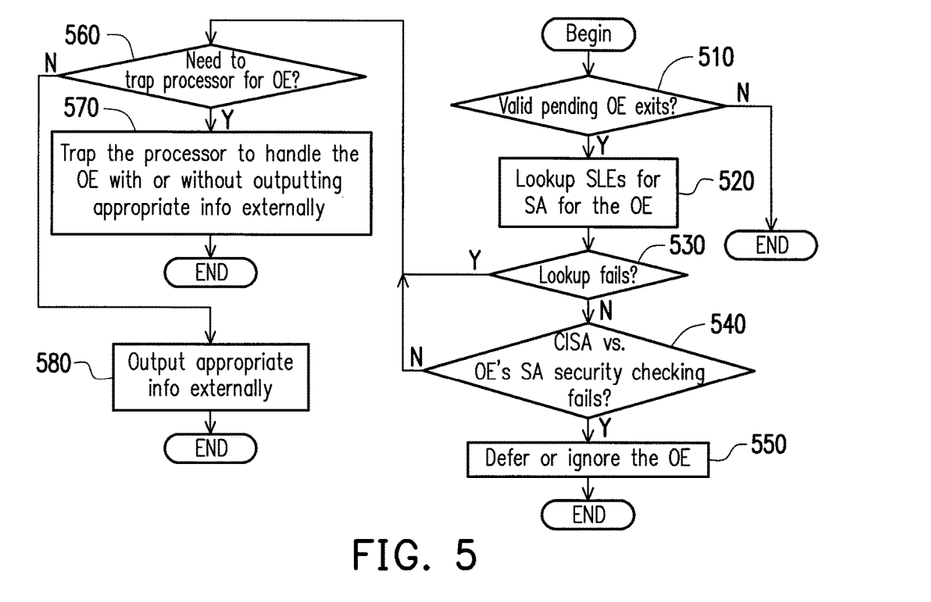

In step 330, the security checking unit 160 performs an OE security checking before the execution of the instruction, whose details are shown in FIG. 5. The OE involved in this security checking is not related to the instruction itself. For example, the OE may be an interrupt or a hardware debugging event such as instruction breakpoint. For this security checking, the OE generator provides the index of the OE to the SLE unit 170. The SLE unit 170 looks up an SA in the SLEs according to the index and tags the OE with the SA. As a result, the security checking unit 160 obtains the SA of the OE from one of the SLEs whose index matches the index of the OE. The SA of the OE is used in the OE security checking.

Figure 7:
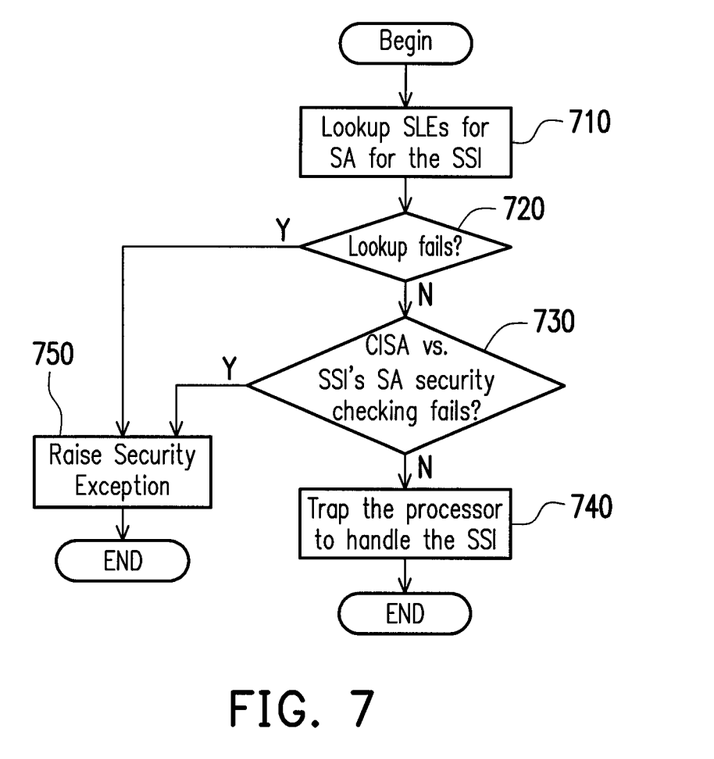

In step 340, the operation resource address generator 130 decodes the instruction to determine the operation resource to be accessed by the instruction and generates the data address or the index associated with the operation resource to be accessed by the instruction. In step 350, the security checking unit 160 performs an SSI security checking or a resource access security checking, whose details are shown in FIG. 7 and FIG. 6, respectively.

When the instruction is an SSI, the operation resource address generator 130 generates the index of the SSI based on the instruction code and/or operands of the SSI and provides the index to the SLE unit 170. For example, the operation resource address generator 130 may use the instruction code of the SSI directly as the index of the SSI or encode the instruction code and some operand value of the SSI into the index of the SSI. In some embodiment, the operation resource address generator 130 may additionally bases on the group ID associated to the fetch address of the SSI to generate the index. The SLE unit 170 looks up an SA in the SLEs according to the index and tags the SSI with the SA. As a result, the security checking unit 160 obtains the code SA of the SSI from one of the SLEs whose index matches the index of the SSI. The code SA of the SSI is used in the SSI security checking.

For the resource access security checking, the operation resource address generator 130 provides the data address or the index associated with the operation resource to the SLE unit 170. The SLE unit 170 looks up an SA in the SLEs according to the data address or the index and tags the operation resource with the SA. As a result, the security checking unit 160 obtains the SA of the operation resource from an SLE whose region covers the data address or an SLE whose index matches the index of the operation resource. The SA of the operation resource is used in the resource access security checking.

Figure 8:
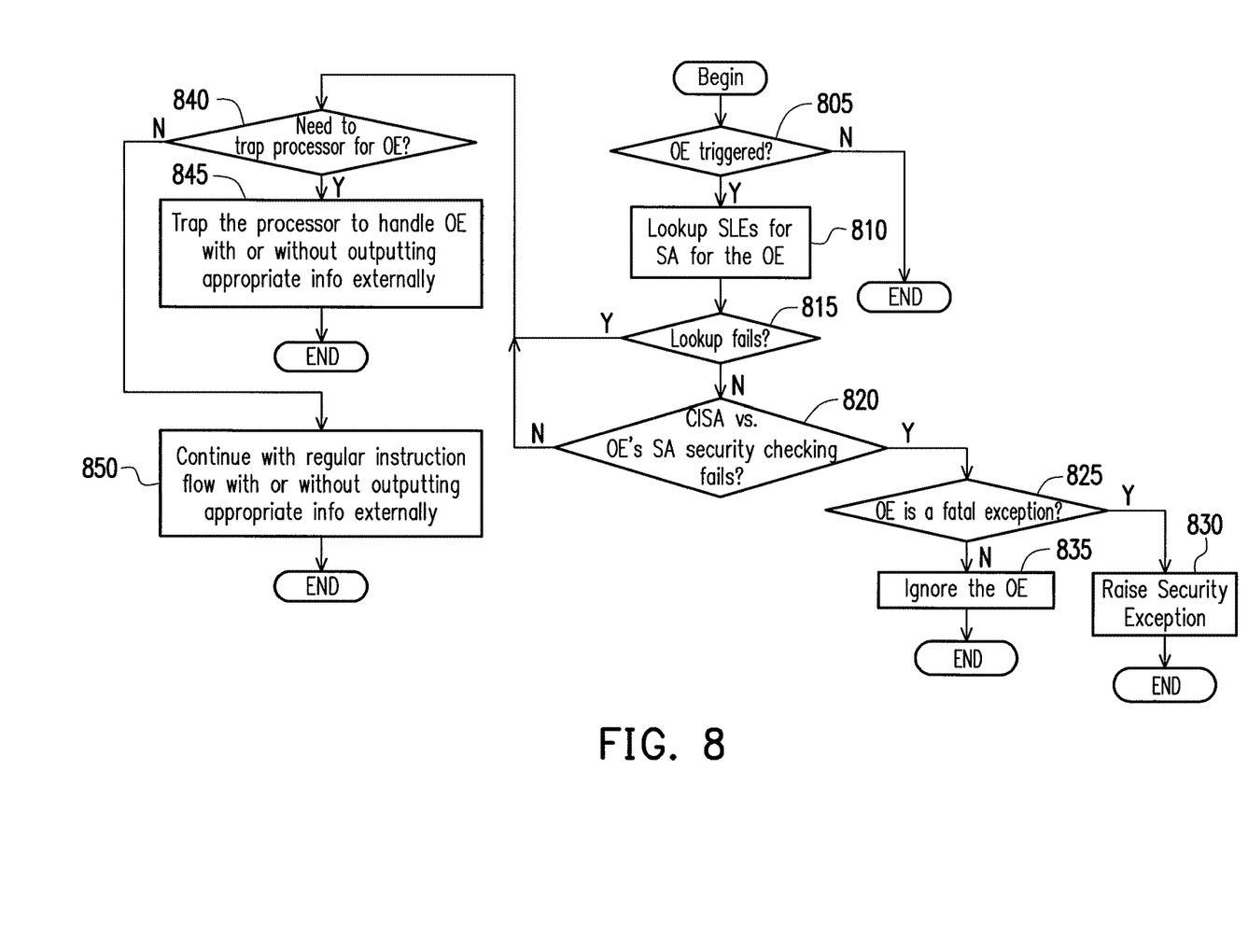

In step 360, the instruction operation unit 140 executes the instruction as it should be. In step 370, the security checking unit 160 performs another OE security checking after the execution of the instruction, whose details are shown in FIG. 8. The OE involved in this security checking is related to the instruction itself. For example, the OE may be an exception raised during the execution of the instruction. For this security checking, the OE generator provides the index of the OE to the SLE unit 170. The SLE unit 170 looks up an SA in the SLEs according to the index and tags the OE with the SA. As a result, the security checking unit 160 obtains the SA of the OE from one of the SLEs whose index matches the index of the OE. The SA of the OE is used in the OE security checking. In step 380, the instruction operation unit 140 commits the instruction and writes back the data modified by the instruction.

Figure 9:
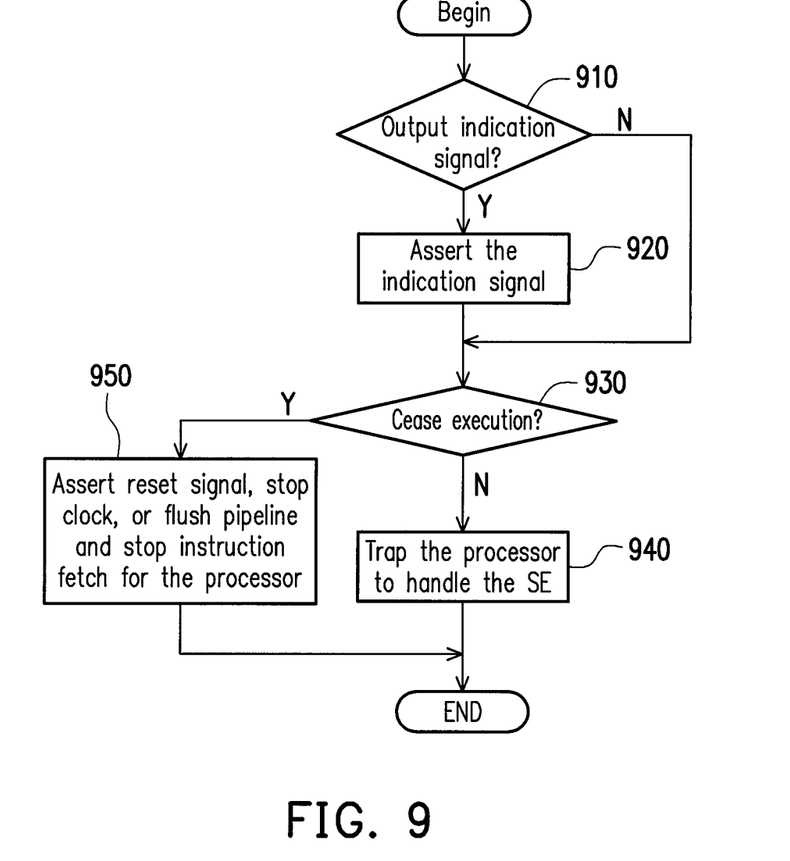

The security checking unit 160 raises a security exception when the instruction fetch security checking fails. The security checking unit 160 also raises a security exception when either of the OE security checking, the SSI security checking, or the resource access security checking fails. The security exception is handled by the security exception unit 180. The details of the handling of the security exception are shown in FIG. 9.

FIG. 4 shows a detailed flow of the instruction fetch security checking performed in step 310 according to an embodiment of the present invention. First, the terms current instruction (CI) and next instruction (NI) need to be explained. The current instruction and the next instruction are two instructions in the fetching order of the processor 100. The instruction fetch unit 120 fetches the next instruction immediately after the instruction fetch unit 120 fetches the current instruction. Just before step 410, the current instruction is already fetched and is in some stage of the execution pipeline of the processor 100 (such as in a stage corresponding to step 330, 340, 350, 360, 370 or 380), and the next instruction is about to be fetched. In some other embodiment of the present invention, both of the current instruction and the next instruction may be fetched at the same time after both of the instructions have passed their corresponding instruction fetch security checking.

In step 410, the instruction fetch address generator 110 generates the fetch address for the next instruction. In step 420, the instruction fetch address generator 110 provides the fetch address to the SLE unit 170 to lookup the SLEs for the ISA of the next instruction in order to tag the next instruction with the ISA. In step 430, the security checking unit 160 checks whether the lookup fails or not.

A lookup failure means the SLE unit 170 fails to find any SLE whose region covers the provided address or any SLE whose index matches the provided index. When the lookup fails, it is a security violation and the security checking unit 160 raises a security exception in step 490. When the lookup passes, the security checking unit 160 checks whether or not the next instruction is the first instruction to be fetched for executing an OE handler routine or an SSI handler routine in step 440. When the next instruction is the first instruction to be fetched for executing an OE handler routine or an SSI handler routine, it is unnecessary to perform more security checking and the flow proceeds to step 470.

Alternatively, when the next instruction is not the first instruction to be fetched for executing an OE handler routine or an SSI handler routine, the security checking unit 160 checks whether the ISA of the next instruction (NISA) is more secure than the ISA of the current instruction (CISA) or not in step 450.

When the ISA of the next instruction is more secure than the ISA of the current instruction in step 450, it is a security violation and the security checking unit 160 raises a security exception in step 490.

When the ISA of the next instruction is no more secure than the ISA of the current instruction in step 450, the security checking unit 160 checks whether or not the group ID checking is required and the group ID associated with the ISA of the current instruction is different from the group ID associated with the ISA of the next instruction in step 470. Whether the group ID checking is required or not is a design choice for the processor 100. If the condition checked in step 470 is true, it is a security violation and the security checking unit 160 raises a security exception in step 490. Otherwise, the security checking passes and the next instruction becomes the current instruction hereinafter. Next, in step 480, the instruction fetch unit 120 fetches the current instruction from the fetch address generated previously by the instruction fetch address generator 110.

Please refer to FIG. 2 and FIG. 4 for some examples of the instruction fetch security checking shown in FIG. 4. Assume the sorted order of security of the four SLEs in FIG. 2 is SLE0, SLE1, SLE2 and SLE3, wherein the SA of SLE0 is the most secure among the four SLEs, and assume the group ID checking is not required. When the execution flow of the processor 100 jumps from the region 3 to the region 0, this transfer is a security violation and a security exception is raised. When the execution flow of the processor 100 jumps from the region 0 to any other region, such a transfer is allowed because the region 0 is the most secure. The instruction fetch security checking shown in FIG. 4 is performed not only for branch instructions, jump instructions, and call instructions, but also for sequential execution. For example, a security violation is raised when the execution flow of the processor 100 enters the address A5 (region 1) from the previous address (region 2).

FIG. 5 shows a detailed flow of the OE security checking performed in step 330 according to an embodiment of the present invention. In step 510, the OE generator 150 checks whether there is a valid pending OE or not. When such an OE exists, the OE generator 150 provides the index of the OE to the SLE unit 170 to lookup the SLEs for the SA of the OE in step 520. In step 530, the security checking unit 160 checks whether the lookup fails or not. When the lookup fails, it means the OE has no associated SA and does not need security checking. As a result, the flow proceeds to step 560 to handle the OE.

When the lookup passes, the security checking unit 160 performs the OE security checking based on the ISA of the current instruction and the SA of the OE in step 540. The OE security checking fails when the ISA of the current instruction is more secure than the SA of the OE. When the security checking in step 540 fails, the OE generator 150 may defer or ignore the OE in step 550. A deferred OE will be handled again in the next iteration of step 330, while an ignored OE will be deleted and not be seen again. For example, when the OE is an interrupt, its interrupt handling may be deferred until the execution flow enters an IFAS region for which the associated security checking passes. Another example is corresponding trace data output (the OE) will be ignored for an instruction that fails the OE security checking.

When the security checking in step 540 passes, the OE generator 150 checks whether trapping the processor 100 to handle the OE is necessary or not in step 560. When the trapping is necessary, the OE generator 150 traps the processor 100 to handle the OE in step 570. For example, when the OE is an interrupt or an exception, it is necessary to trap the processor 100 to redirect the execution flow to a predetermined handler routine. In addition, the OE generator 150 may output appropriate information externally for some external host to respond to the OE. When the trapping is unnecessary, the OE generator 150 output appropriate information externally in step 580. For example, the OE generator 150 may simply output corresponding debug information through a port when the OE is instruction trace.

FIG. 6 shows a detailed flow of the resource access security checking performed in step 350 according to an embodiment of the present invention. In step 605, the operation resource address generator 130 checks whether the current instruction is an SSI or not. When the current instruction is an SSI, the flow proceeds to step 610 to perform the SSI security checking. Details of the SSI security checking are shown in FIG. 7.

When the current instruction is not an SSI, the operation resource address generator 130 provides the address or the index of the operation resource to the SLE unit 170 to lookup the SLEs for the SA of the operation resource needed by the current instruction in step 615. The security checking unit 160 checks whether the lookup fails or not in step 620. When the lookup fails, it is a security violation and the security checking unit 160 raises a security exception in step 625.

When the lookup passes, the security checking unit 160 checks whether the SA of the operation resource (DSA) is more secure than the ISA of the current instruction or not in step 630. When the condition checked in step 630 is true, it is a security violation and the security checking unit 160 raises a security exception in step 625.

When the condition checked in step 630 is false, the security checking unit 160 checks whether or not the group ID checking is required and the group ID associated with the ISA of the current instruction is different from the group ID associated with the SA of the operation resource in step 640. If the condition checked in step 640 is true, it is a security violation and the security checking unit 160 raises a security exception in step 645. Otherwise, the security checking passes and the instruction operation unit 140 may access the operation resource for instruction operation in step 650.

FIG. 7 shows a detailed flow of the SSI security checking performed in step 350 according to an embodiment of the present invention. In step 710, the operation resource address generator 130 provides the index of the SSI to the SLE unit 170 to lookup the SLEs for the code SA of the SSI. In step 720, the security checking unit 160 checks whether the lookup fails or not. When the lookup fails, it is a security violation and the security checking unit 160 raises a security exception in step 750.

When the lookup passes, the security checking unit 160 performs the SSI security checking in step 730. The SSI security checking fails when the ISA of the SSI instruction is less secure than the code SA of the SSI instruction. When the SSI security checking fails, the security checking unit 160 raises a security exception in step 750. When the SSI security checking passes, the security checking unit 160 traps the processor 100 to handle the SSI in step 740.

FIG. 8 shows a detailed flow of the OE security checking performed in step 370 according to an embodiment of the present invention. In step 805, the OE generator 150 checks whether the execution of the current instruction triggers an OE or not. When such an OE exists, the OE generator 150 provides the index of the OE to the SLE unit 170 to lookup the SLEs for the SA of the OE in step 810. In step 815, the security checking unit 160 checks whether the lookup fails or not. When the lookup fails, it means the OE has no associated SA and does not need security checking. As a result, the flow proceeds to step 840 to handle the OE.

When the lookup passes, the security checking unit 160 performs the OE security checking in step 820. The OE security checking fails when the ISA of the current instruction is more secure than the SA of the OE. When the security checking in step 820 fails, the security checking unit 160 checks whether the OE is a fatal exception or not. A fatal exception is triggered when the current instruction is not properly finished and endangers the state or consistency of the processor 100. When the OE is a fatal exception, the security checking unit 160 raises a security exception in step 830. Otherwise, the OE generator 150 may ignore the OE in step 835.

When the security checking in step 820 passes, the OE generator 150 checks whether trapping the processor 100 to handle the OE is necessary or not in step 840. When the trapping is necessary, the OE generator 150 traps the processor 100 to handle the OE in step 845. In addition, the OE generator 150 may output appropriate information externally for some external host to respond to the OE. When the trapping is unnecessary, return to the main flow shown in FIG. 3. In addition, the OE generator 150 may output appropriate information externally in step 850.

FIG. 9 shows a detailed flow of security exception handling performed by the security exception unit 180 when a security exception is raised according to an embodiment of the present invention. In step 910, the security exception unit 180 checks whether outputting an indication signal is required or not. Whether to output an indication signal in response to a security exception may be set in advance. When the output is required, the security exception unit 180 asserts the indication signal in step 920 so that the security exception may be handled by external means. Otherwise, the flow proceeds to step 930.

In step 930, the security exception unit 180 checks whether it is necessary to cease the execution of the processor 100 or not. When it is unnecessary to cease the execution, the security exception unit 180 traps the processor to handle the security exception (SE) in step 940. The handler routine of the security exception may reside in a most secure region, for which the original view of IFAS and LSAS remains the same. Alternatively, the handler routine of the security exception may reside in some IFAS/LSAS that only can be seen by the processor 100 when the processor 100 is trapped into security exception. When it is necessary to cease the execution, the security exception unit 180 may reset and halt the processor 100 by asserting a reset signal or halt the processor 100 completely by stopping the clock signal input to the processor 100 or flushing the pipeline of the processor 100 and stopping the instruction fetch of the processor 100 in step 950.

In summary, the present invention is directed to a secure protection method and a processor enforcing computing security by performing security checking on instructions, operation resources, and OEs to provide solid security boundary for software execution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A secure protection method, executed by a processor, comprising:
    obtaining, from a plurality of security lookup entries (SLEs), an instruction security attribute (ISA) of a first instruction, an ISA of a second instruction, a security attribute (SA) of an operational event (OE) and a data security attribute (DSA) of an operation resource accessed by the first instruction, wherein the OE is generated as a side effect when the processor fetches or executes the first instruction, generated as a monitoring result on the first instruction, or generated in response to an external input of the processor;
    performing a first security checking before or after executing the first instruction according to the ISA of the first instruction and the SA of the OE;
    ignoring the OE, deferring the OE, or raising a security exception when the first security checking fails;
    performing a second security checking and a third security checking, wherein:
        the second security checking is to determine whether the ISA of the first instruction is less secure than the DSA of the operation resource by comparing the ISA of the first instruction with the DSA of the operation resource, wherein when the ISA of the first instruction is determined not less secure than the DSA of the operation resource, accessing the operation resource for performing the first instruction, and
        the third security checking is to determine whether the ISA of the first instruction is less secure than the ISA of the second instruction by comparing the ISA of the first instruction with the ISA of the second instruction, wherein the processor fetches the second instruction immediately after the processor fetches the first instruction; and
    raising the security exception when any one of the second security checking and the third security checking fails.

2. The secure protection method of claim 1, wherein:
    the first security checking fails when the ISA of the first instruction is more secure than the SA of the OE,
    the second security checking fails when the ISA of the first instruction is less secure than the SA of the operation resource or when the ISA of the first instruction is no less secure than the SA of the operation resource and a group identification (ID) associated with the ISA of the first instruction is different from a group ID associated with the SA of the operation resource, and
    the third security checking fails when the ISA of the first instruction is less secure than the ISA of the second instruction or when the ISA of the first instruction is no less secure than the ISA of the second instruction and the group ID associated with the ISA of the first instruction is different from a group ID associated with the ISA of the second instruction.

3. The secure protection method of claim 1, wherein the operation resource is data addressed in a load/store address space (LSAS) mapped to an internal storage or an external interface of the processor that the first instruction reads data from or writes data to, a register of the processor, or one of the plurality of SLEs stored or accessed by the processor,
    wherein each of the plurality of SLEs records a region of the LSAS or an instruction fetch address space (IFAS) from which the processor fetches the first instruction and the second instruction,
    wherein each of the plurality of SLEs further records an SA associated with the region recorded by that SLE.

4. The secure protection method of claim 3, wherein:
    the ISA of the first instruction is obtained from one of the plurality of SLEs whose region covers a fetch address of the first instruction, and
    the ISA of the second instruction is obtained from one of the plurality of SLEs whose region covers a fetch address of the second instruction, the secure protection method further comprising:
    obtaining an SA of the data addressed in the LSAS from one of the plurality of SLEs whose region covers an address of the data addressed in the LSAS.

5. The secure protection method of claim 3, wherein instructions fetched by the processor in a host debugging mode are tagged with an SA of a special one of the plurality of SLEs and the special one of the plurality of SLEs is solely dedicated to the host debugging mode.

6. The secure protection method of claim 1, wherein the processor stores or accesses the plurality of SLEs, each of the plurality of SLEs comprises an SA and each of the plurality of SLEs is associated with an index, and the secure protection method further comprises:
    obtaining the SA of the OE from one of the plurality of SLEs whose index matches an index of the OE; and
    obtaining the SA of the operation resource from one of the plurality of SLEs whose index matches an index of the operation resource.

7. The secure protection method of claim 1, further comprising:
    resetting the processor, halting the processor, or trapping the processor to handle the security exception in response to the security exception.

8. A processor, comprising:
    an instruction fetch circuit fetching a first instruction from an instruction fetch address space (IFAS);

an instruction operation circuit, coupled to the instruction fetch circuit, executing the first instruction;
an operational event (OE) circuit, coupled to the instruction fetch circuit and the instruction operation circuit, generating an OE as a side effect when the instruction fetch circuit fetches the first instruction or when the instruction operation circuit executes the first instruction, or as a monitoring result on the first instruction, or in response to an external input of the processor;
a security checking circuit, coupled to the instruction fetch circuit, the instruction operation circuit, and the OE circuit, obtaining, from a plurality of security lookup entries (SLEs), an instruction security attribute (ISA) of the first instruction, an ISA of a second instruction, a security attribute (SA) of the OE and a data security attribute (DSA) of an operation resource accessed by the first instruction, and performing a first security checking before or after the instruction operation circuit executes the first instruction according to the ISA of the first instruction and the SA of the OE, wherein the OE circuit ignores the OE, defers the OE, or raises a security exception when the first security checking fails; and
an instruction fetch address circuit, coupled to the instruction fetch circuit, generating fetch addresses of the first instruction and the second instruction, wherein the instruction fetch circuit fetches the second instruction immediately after the instruction fetch circuit fetches the first instruction; and
an operation resource address circuit, coupled to the instruction fetch circuit and the instruction operation circuit, generating a data address or an index associated with an operation resource accessed by the first instruction,
wherein the security checking circuit further performs a second security checking and a third security checking, wherein:
the second security checking is to determine whether the ISA of the first instruction is less secure than the DSA of the operation resource by comparing the ISA of the first instruction with the DSA of the operation resource, wherein when the ISA of the first instruction is determined not less secure than the DSA of the operation resource, accessing the operation resource for performing the first instruction and the SA of the operation resource is obtained according to the data address or the index,
the third security checking is to determine whether the ISA of the first instruction is less secure than the ISA of the second instruction by comparing the ISA of the first instruction with the ISA of the second instruction, and
the security checking circuit raises the security exception when either the second security checking or the third security checking fails.
9. The processor of claim 8, wherein:
the first security checking fails when the ISA of the first instruction is more secure than the SA of the OE,
the second security checking fails when the ISA of the first instruction is less secure than the SA of the operation resource or when the ISA of the first instruction is no less secure than the SA of the operation resource and a group identification (ID) associated with the ISA of the first instruction is different from a group ID associated with the SA of the operation resource, and
the third security checking fails when the ISA of the first instruction is less secure than the ISA of the second instruction or when the ISA of the first instruction is no less secure than the ISA of the second instruction and the group ID associated with the ISA of the first instruction is different from a group ID associated with the ISA of the second instruction.
10. The processor of claim 8, wherein the operation resource is data addressed in a load/store address space (LSAS) mapped to an internal storage or an external interface of the processor that the first instruction reads data from or writes data to, a register of the processor, or one of the plurality of SLEs, and the processor further comprises:
an security lookup entry (SLE) circuit, coupled to the instruction fetch address circuit, the instruction fetch circuit, the operation resource address circuit, the OE circuit, and the security checking circuit, providing the plurality of SLEs,
wherein each of the plurality of SLEs records a region of the LSAS or the IFAS from which the processor fetches the first instruction and the second instruction,
wherein each of the plurality of SLEs further records an SA associated with the region recorded by that SLE.
11. The processor of claim 10, wherein the instruction fetch circuit obtains the ISA of the first instruction from one of the plurality of SLEs whose region covers the fetch address of the first instruction, the instruction fetch circuit obtains the ISA of the second instruction from one of the plurality of SLEs whose region covers the fetch address of the second instruction, and the security checking circuit obtains an SA of the data addressed in the LSAS from one of the plurality of SLEs whose region covers an address of the data addressed in the LSAS.
12. The processor of claim 10, wherein instructions fetched by the instruction fetch circuit in a host debugging mode are tagged with an SA of a special one of the plurality of SLEs and the special one of the plurality of SLEs is solely dedicated to the host debugging mode.
13. The processor of claim 8, further comprising:
an security lookup entry (SLE) circuit, coupled to the instruction fetch address circuit, the instruction fetch circuit, the operation resource address circuit, the OE circuit, and the security checking circuit, providing the plurality of SLEs, wherein each of the plurality of SLEs comprises an SA and each of the plurality of SLEs is associated with an index, wherein the security checking circuit obtains the SA of the OE from one of the plurality of SLEs whose index matches an index of the OE, and obtains the SA of the operation resource from one of the plurality of SLEs whose index matches an index of the operation resource.
14. The processor of claim 8, further comprising:
a security exception circuit, coupled to the security checking circuit, resetting the processor, halting the processor, or trapping the processor to handle the security exception in response to the security exception.

* * * * *